Patented June 10, 1930

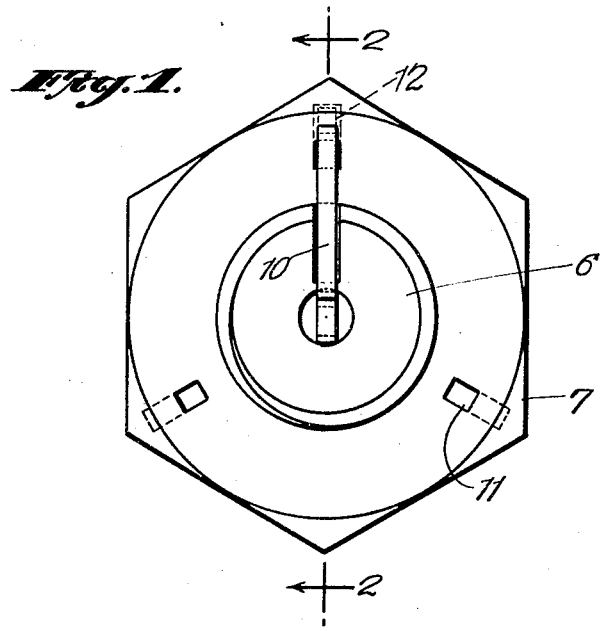
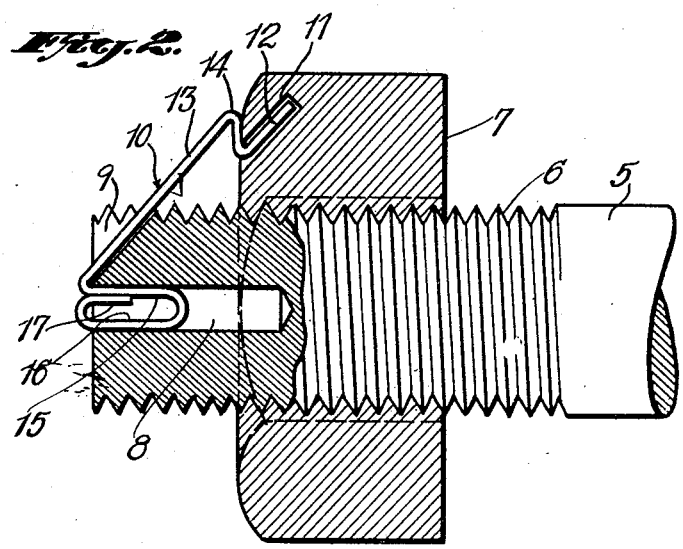
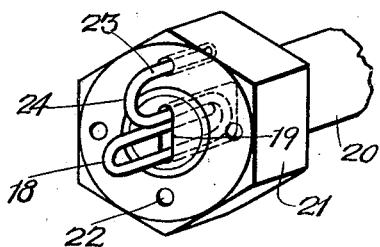

1,762,739

UNITED STATES PATENT OFFICE

JOHN E. PHILLIPS, OF NEW YORK, N. Y.

NUT LOCK

Application filed December 3, 1928. Serial No. 323,497.

This invention relates to nut locking devices and in particular to a member which is arranged to be applied to the end of a bolt to have connection with a nut threaded thereon so that the nut will be maintained in position on the end of the bolt and will be prevented from becoming unthreaded therefrom during use.

It is well known that the loss of parts and sometimes accidents occur by reason of the fact that a nut has become unthreaded from a bolt or other holding member by continual jarring or action of the parts with the result that the nut is gradually unthreaded and works its way off the bolt and fails to perform the function for which it has been intended. In order to prevent this working loose of the nut, I have provided a spring-like locking member which has a certain degree of adjustment and can therefore be used in connection with a nut that is threaded over a bolt end.

To enable others skilled in the art to fully comprehend the underlying features of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in front elevation showing the use of my improved nut lock as it would appear in position on a bolt and nut in retaining the latter in place.

Figure 2 is a section taken on the line 2—2 of Figure 1 showing how the locking member is associated with the nut and also with the bolt and further showing how the end of the locking member provides a wedge whereby the same is firmly secured in place in the bolt.

Figure 3 is a view in perspective showing a modified form of my invention in which an elongated slot is provided in the bolt, the holding member being of slightly different shape to accommodate itself to a nut which is not entirely threaded on to a bolt.

Referring to the drawings in detail, 5 indicates a bolt, a portion only of which is shown and the outer end of which is provided with the screw threads 6. This threaded end of the bolt is of course, arranged to receive an internally threaded nut 7 which may be drawn up on the threaded end of the bolt to secure any members to be held in position. In order that the nut may be prevented from rotation or unthreading movement, I have provided in the end of the bolt, a suitable bore 8 which is made by drilling the bolt to provide a concentric opening at the free end thereof. This opening may be of any depth to accommodate one end of the locking member. The bolt is further provided with an angular slot 9 which terminates adjacent the outer extremity of the bored recess 8, the bottom of this slot providing a seat for the body portion of a suitable locking member 10. The nut is also provided with the recesses 11 which are disposed at an angle in the nut and extending away from the center thereof. These recesses 11 also provide receptacles for the end 12 of the locking member 10. This locking member is made of tempered spring steel, preferably and is provided intermediate its body portion 13 and end 12 with a shoulder 14 which is arranged to engage the outer surface of the nut 7 adjacent the recess 11. This shoulder 14 in its abutment against the nut 7 will have a tendency to prevent outward movement thereof, the bolt engaging end of the locking member 10 is bent to provide the spaced portions 15 and 16, the outer terminus of the latter being inturned as at 17 to provide a wedging portion for the locking member. It will be understood that the locking member, being made of resilient spring steel may be compressed in its bolt engaging end and may be driven into place in the recess 8 by gently tapping the end thereof until the body portion 13 seats itself in the slot 9 of the bolt. The end 12 thereof will then be, of course, seated in the nut and will be prevented from turning due to the fact that the locking member is disposed in the slot 9 and its end engages the nut. It will be also noted in this respect that the portions 15, 16 of the locking member may be driven into the bolt recess 8 as far as desired, this providing an adjustment whereby the nut may be threaded on to the bolt any required distance before the nut lock is applied thereto.

When the nut locking member has been placed in the recess 8, the tendency for the ends 15, 16 to expand, will frictionally maintain the nut lock in position and jarring and vibration of the part will not have a tendency to loosen the locking member.

In the modification illustrated in Figure 3, use is made of a piece of wire-like spring stock 18 which is bent substantially to the shape of the member 15 illustrated in Figures 1 and 2 so that it can be compressed within the elongated slot 19 provided in the bolt 20, the bolt end, of course, being threaded and arranged to receive the nut 20 which is also provided with a series of bores 22 arranged to receive the extended end 23 of the locking member. This extended end 23 is shaped to provide a curved portion 24 which permits the locking device being used when the nut is not entirely threaded on to the bolt but projects over the end thereof, in which instance the portion 23 will of course engage any one of the bores 22 and will effectively lock the nut in position on the bolt.

It is evident that I have provided a nut lock which, being of a resilient nature, may be forced into position to secure a nut at any of its threaded positions on the end of the bolt.

It is also evident that the nut lock construction enables the same to be frictionally retained in the end of a bolt so that vibration will not cause loss thereof.

It will be further noted that the nut lock member being provided with a suitable nut engaging shoulder will prevent movement of the nut longitudinally and will unite the parts securely together to prevent loss of the nut.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

1. In combination, a bolt having a central opening therein, a nut having an angularly disposed pocket therein, a resilient locking member arranged to engage the opening and the pocket, an expandable end on the locking member for retaining the same in position and a shoulder on the nut engaging end of the lock member and at an angle thereto overlying the nut.

2. In combination, a bolt having a central bore, a nut therefor having an angularly disposed pocket, a locking member comprising an expandable end arranged to engage said bore, a seat in the bolt engaged by said locking member for preventing rotation of the latter and an end on the locking member for engagement with the pocket of said nut, and a shoulder on the locking member at an angle to the end adapted to overlie the nut.

In testimony whereof I affix my signature.

JOHN E. PHILLIPS. [L. S.]